May 30, 1939.  T. A. McGREGOR  2,160,482
SEAT CONSTRUCTION
Filed Nov. 9, 1936   2 Sheets-Sheet 1
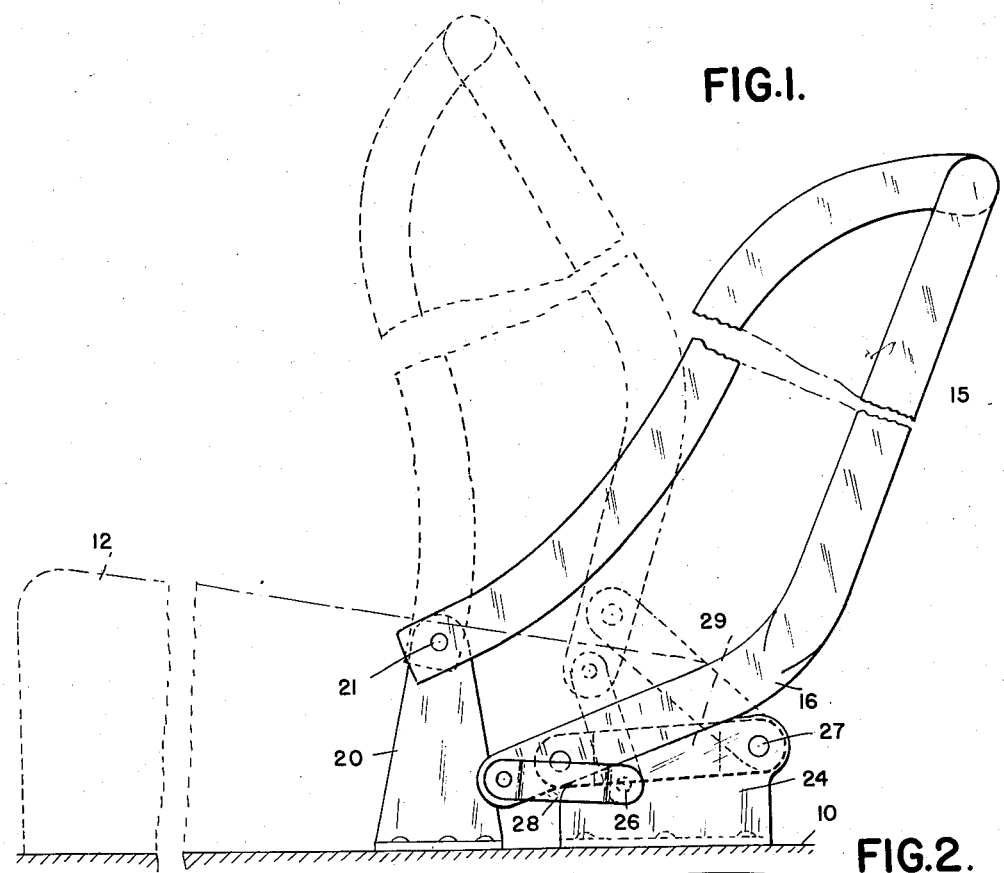
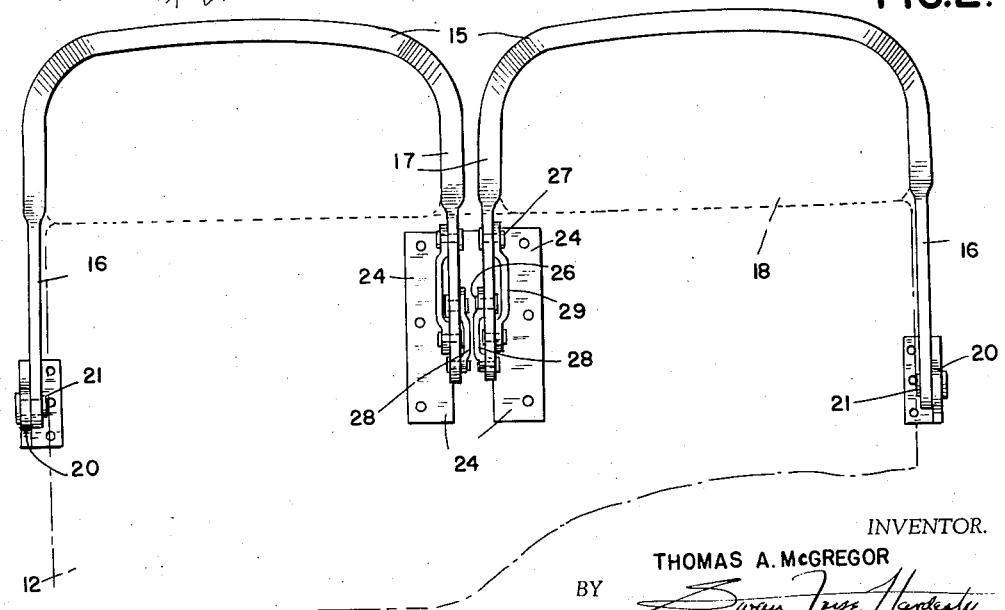
INVENTOR.
THOMAS A. McGREGOR
ATTORNEYS May 30, 1939.  T. A. McGREGOR  2,160,482
SEAT CONSTRUCTION
Filed Nov. 9, 1936   2 Sheets-Sheet 2

INVENTOR.
THOMAS A. McGREGOR
BY
ATTORNEYS

Patented May 30, 1939

2,160,482

UNITED STATES PATENT OFFICE 2,160,482

SEAT CONSTRUCTION

Thomas A. McGregor, Pontiac, Mich., assignor to American Forging & Socket Company, Pontiac, Mich., a corporation of Michigan Application November 9, 1936, Serial No. 109,861

4 Claims. (Cl. 155—5)

This invention relates to foldable seat frames, and particularly to improving the construction of seats of the variety used in enclosed automobiles and provided with hinged backs adapted to tilt forwardly to allow readier access to the tonneau or rear section of the passenger compartment. In automobile bodies of the two-door type having front and back seats, it is usually necessary that the front seat or seats be partly or entirely foldable for this purpose. It was formerly the practice to provide two individual front seats. These were either bodily swingable forwardly, with the seat and back moving as a unit, or provided back portions hinged with respect to the seat cushion, and so independently swingable toward the front. More recently, the introduction of wider vehicle bodies has made it desirable that the front seat accommodate three persons comfortably. A seat extending completely across the car must therefore be used, rather than two individual seats. An especially advantageous construction for this purpose comprises a single continuous seat cushion of the sedan type, extending the full width of the body, while the back is centrally divided vertically into two separately hinged sections which are so shaped at their line of meeting as to provide a continuous flush surface. Such seats, as heretofore made, have incorporated hinging means for the two back sections located at or very close to the rear edge of the seat cushion, for it is of course important that the central hinging means for the adjacent or inner ends of the back sections be located far enough to the rear so as not to interfere with the action or comfort of the central part of the seat.

Frequently, however, such simple hinging of the back portions at the rear of the seat will not allow sufficient clearance at the doorway.

With these considerations in view, the present invention aims to provide improved hinged supporting means for such seat backs of the class having divided and separately movable sections which cooperate to form a continuous back, incorporating linkage mechanism so arranged that all parts are out of the way of the seat and back, and no interference with the use of the central portion of the seat is involved, as well as so guiding the swinging of the seat back as to cause it to move bodily to the front about a center of motion well forward of the rear edge of the seat thus providing greatly increased clearance of the doorway.

Other objects and advantages will be apparent from the following description, wherein reference is made to the accompanying drawings illustrating a preferred embodiment of my invention and wherein similar reference numerals designate similar parts throughout the several views.

In the drawings:

Figure 1 is a diagrammatic side elevational view of a seat frame provided with back hinging means incorporating the principles of this invention.

Figure 2 is a plan view of the same.

Figure 3:
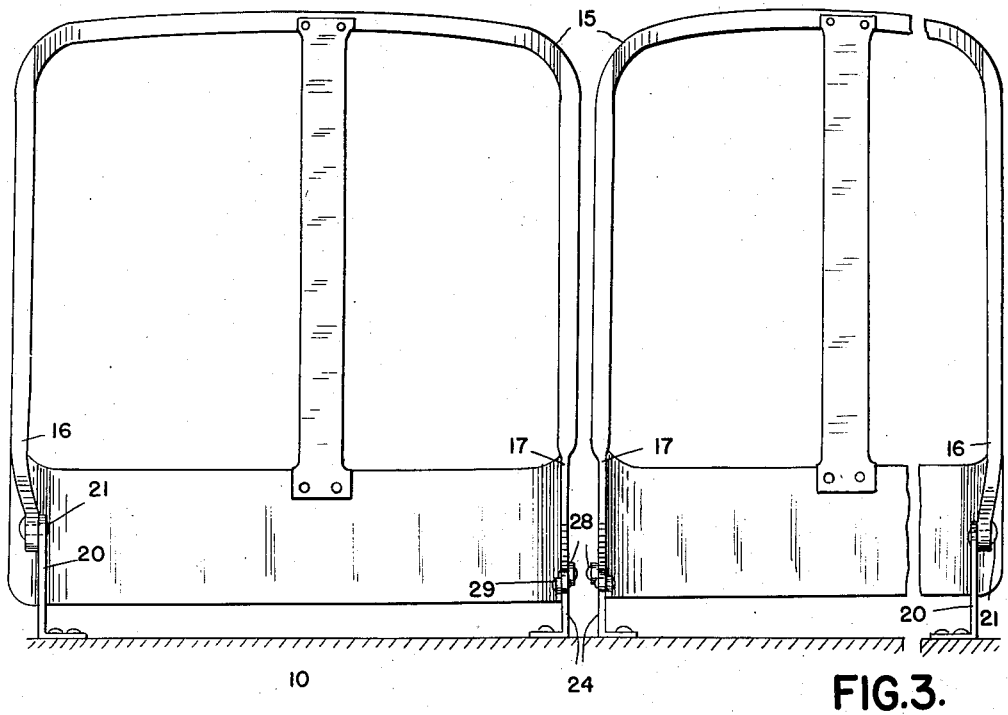
Figure 3 is a front view of the same.
Figure 4:
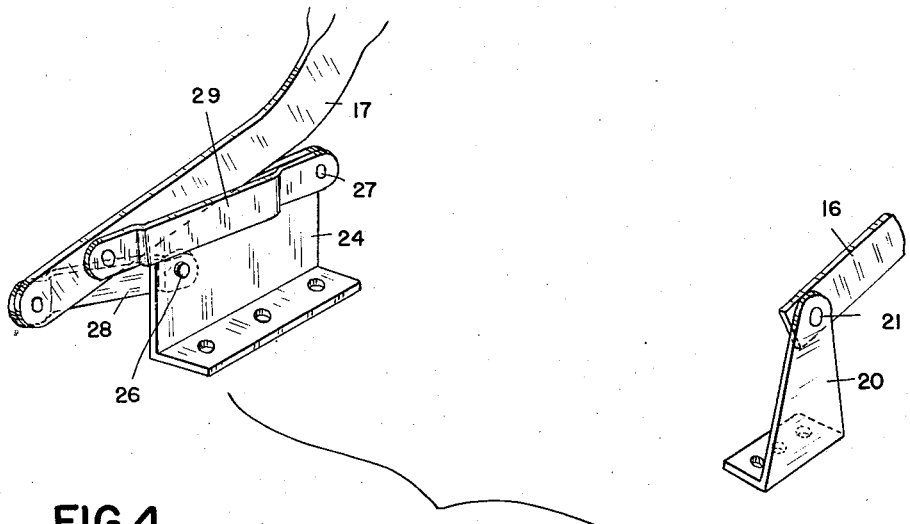
Figure 4 is a diagrammatic perspective view, centrally broken away, of the hinging means as applied to both ends of one back section.

Referring now to the drawings, reference character 10 designates the floor, upon which the seat cushion 12 is carried, the back of the seat being formed in two separate sections, the framework of each consisting of a bow 15. The two bows cooperate to substantially outline the back. The precise supporting of the seat and form of the seat and back framework will be seen to be independent of the invention, although the frame is preferably so formed that the upholstery when applied may extend substantially straight and flush up to the line of division, the effect being that of a continuous back. The general arrangement of the upholstery is indicated at 18 in Figure 2.

The outside leg 16 of each bow 15 is pivotally connected to a simple upstanding bracket 20, as by upset pivot pin 21. These points of pivoting are located well forward of the back of the seat, as best shown in Figure 1. This will be seen to provide more clearance when the back of the seat is swung forwardly. The outside leg of each bow thus also extends downwardly alongside one end of the cushion, giving the back a hollowed or "bucket" contour definitely advantageous from the standpoint of the upholsterer, inasmuch as it imparts a more pleasing and comfortable inwardly curved shape to the ends of the seat back. The central legs 17 of the bows, however, are located farther back, extending downwardly behind the back cushioning, to a point below the seat cushion, and thence forwardly, where they are so linked to a special hinge bracket as to enable the back of the seat to swing about a center of movement substantially in line with the axis of pivot 21.

Beneath and near the centre of the seat cushion, which may be recessed upon the under side to accommodate them, are arranged a pair of upstanding sheet metal angle brackets 24, fixedly positioned with respect to the seat cushion and shown as secured to the floor. Brackets 24 carry pivot pins 26, 27 which are somewhat spaced from each other, one nearer the front and the other nearer the back of the seat. The axes of these pins are parallel to the common axis of the aligned pins 21. Links 28, 29 are articulated to pins 26, 27 respectively, and these are spacedly connected at their outer ends to the legs 17 of the bows, one such assembly being provided for each bow. It will be seen that the back link 29 is longer than the front link 28, and that the links are connected to the bows upon closer centers than their points of pivotal connection to the bracket. It will also be seen that the links are located one upon either side of the bracket and the bow, so that the latter is aligned with the bracket, which is so inclined as to form a seat for the bow when the back is in its normal rest position.

Upon inspection of Figure 1 it will be seen that when either back section is swung forwardly, the links so control its movement as to cause the inner end of the bows to swing in a curved path which is not centered in the bracket means, but corresponds substantially to an arc described about centers located forwardly of the back of the seat and approximately concentric with pivots 21. When the back section is in its normal position, the lowermost, forwardly bent portion of the leg 17 is depressed to a level too low to interfere with the seat, and the entire leg is also located well back of those portions of the seat which are affected by an occupant, while when the section is swung forwardly it moves bodily upward and toward the front as if directly mounted at both ends upon pivots located as are pins 21. Increased door clearance is thus provided without interference with the comfort of the seat.

While it will be apparent that the illustrated embodiment of my invention herein disclosed are well calculated to adequately fulfill the objects and advantages primarily stated, it is to be understood that the invention is susceptible to variation, modification and change within the spirit and scope of the subjoined claims.

What I claim is:

1. A foldable seat construction including a seat portion, a back portion normally extending upwardly from a line located near the rear edge of the seat portion, and supporting hinge means for the back portion comprising an upstanding bracket element located near the rear edge of and below the seat portion, a pair of links articulated to said bracket element upon opposite sides thereof and swingable vertically, said links being at their other ends articulated to said back portion to control the swinging movement thereof, said back portion having a bottom section engageable with the top of the bracket element when said back portion is in its normal position, the links extending upon opposite sides of both the bracket element and said bottom section of the back portion to maintain the alignment thereof.

2. A foldable seat construction comprising in combination with a seat and a back normally extending upwardly from a position near the rear of the seat, supporting means for the back including a base element, swingable supporting and guide links carried by the base element and supporting the back from below the used portion of the seat, said guide links extending forwardly from the base element and forcing the back when swung to move substantially about a center forward of said position near the rear of the seat.

3. A seat construction as set forth in claim 2 in which said back extends from a midportion to one end of the seat and said links are arranged between the ends of the seat, and additional hinging means for said back comprising pivot portions connected to the back and arranged at the end of the seat and between the front and rear thereof, said pivot portions being in substantial alignment with the center of movement of the swingable supporting means.

4. In combination with a seat and a back normally extending upwardly from a line located near the rear of the seat, supporting hinge means for the back comprising fixedly supported bracket means, a pair of links, one longer than the other, supporting the back from the bracket means, said links being connected to the back upon closer centers than to the bracket means, the axes of connection of the longer links to the bracket means and to the back being farther to the rear than are the equivalent axes of the shorter link, said links extending generally horizontally when the back is in normal position and being connected to the back at their forward ends and to the bracket means at their rear ends, whereby said back may swing bodily forwardly about an approximate center of movement forward of the normal plane of the back.

THOMAS A. McGREGOR.